United States Patent
Mahindru et al.

(10) Patent No.: US 10,129,169 B2
(45) Date of Patent: Nov. 13, 2018

(54) SPECIFYING A HIGHLY-RESILIENT SYSTEM IN A DISAGGREGATED COMPUTE ENVIRONMENT

(71) Applicant: International Business Machines Corporation, Armonk, NY (US)

(72) Inventors: Ruchi Mahindru, Elmsford, NY (US); John Alan Bivens, Ossining, NY (US); Koushik K. Das, New York, NY (US); Min Li, San Jose, CA (US); Harigovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 15/093,260

(22) Filed: Apr. 7, 2016

(65) Prior Publication Data

US 2017/0295108 A1    Oct. 12, 2017

(51) Int. Cl.
*G06F 15/173* (2006.01)
*H04L 12/911* (2013.01)
*H04L 12/927* (2013.01)

(52) U.S. Cl.
CPC ............ *H04L 47/70* (2013.01); *H04L 47/805* (2013.01); *H04L 47/822* (2013.01)

(58) Field of Classification Search
CPC ...... H04L 47/70; H04L 47/805; H04L 47/822
See application file for complete search history.

(56) References Cited

U.S. PATENT DOCUMENTS

| 6,366,945 | B1 * | 4/2002 | Fong ................... G06F 9/5066 718/104 |
| 8,954,698 | B2 | 2/2015 | Schenfeld et al. |
| 8,972,983 | B2 * | 3/2015 | Li ........................ G06F 9/5066 370/229 |
| 9,077,613 | B2 | 7/2015 | Deng et al. |
| 9,258,252 | B1 * | 2/2016 | Atchity ................ H04L 47/788 |

(Continued)

OTHER PUBLICATIONS

Abali et al, "Disaggregated and optically interconnected memory: when will it be cost effective?," Mar. 3, 2015.

(Continued)

*Primary Examiner* — Mohammed A Wasel
(74) *Attorney, Agent, or Firm* — Jeffrey S. LaBaw; David H. Judson

(57) ABSTRACT

Server resources in a data center are disaggregated into shared server resource pools. Servers are constructed dynamically, on-demand and based on workload requirements and a tenant's resiliency requirements (e.g., as specified in an SLA), by allocating from these resource pools. A disaggregated compute system of this type keeps track of resources that are available in the shared server resource pools, and it manages those resources based on that information and the health of the resources. As a workload is processed by the server entity and component resources fail, the server entity composition is changed, e.g. by allocating other resources to the server entity, or by transitioning to other server entities, to ensure that a resiliency requirement is maintained.

25 Claims, 7 Drawing Sheets

(56) References Cited

U.S. PATENT DOCUMENTS

| | | | |
|---|---|---|---|
| 9,311,376 B2* | 4/2016 | Narasayya | G06F 17/30575 |
| 9,348,724 B2* | 5/2016 | Ota | G06F 9/45558 |
| 2003/0046396 A1* | 3/2003 | Richter | G06F 9/505 |
| | | | 709/226 |
| 2004/0205180 A1* | 10/2004 | Srivastava | G06F 9/5061 |
| | | | 709/223 |
| 2004/0267897 A1 | 12/2004 | Hill et al. | |
| 2009/0183168 A1* | 7/2009 | Uchida | G06F 9/5027 |
| | | | 718/104 |
| 2010/0268983 A1* | 10/2010 | Raghunandan | G06F 11/1482 |
| | | | 714/3 |
| 2012/0054763 A1* | 3/2012 | Srinivasan | G06F 9/5005 |
| | | | 718/104 |
| 2012/0254445 A1* | 10/2012 | Kawamoto | G06F 9/5077 |
| | | | 709/226 |
| 2014/0059379 A1* | 2/2014 | Ren | G06F 11/08 |
| | | | 714/15 |
| 2014/0071980 A1* | 3/2014 | Kovalenko | H04M 3/5237 |
| | | | 370/352 |
| 2016/0210175 A1* | 7/2016 | Morimura | G06F 9/45533 |

OTHER PUBLICATIONS

Barla, et al, "Optimal design of virtual networks for resilient cloud services," 2013 9th International Conference on the Design of Reliable Communication Network (DRCN), pp. 218-225, IEEE 2013.

Yeow, et al., "A Resilient Architecture for Automated Fault Tolerance in Virtualized Data Centers," Network Operations and Management Symposium (NOMS), pp. 866-869, IEEE, 2010.

Simpson, "Deliverable 4.2-Resilient Cloud Management," SEcure Cloud computing for CRitical infrastructure IT, Dec. 2013.

* cited by examiner

SPECIFYING A HIGHLY-RESILIENT SYSTEM IN A DISAGGREGATED COMPUTE ENVIRONMENT

BACKGROUND OF THE INVENTION

Technical Field

This disclosure relates generally to data processing systems in a data center operating environment.

Background of the Related Art

A well-known information technology (IT) delivery model is cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

Within the data center itself, a data center network typically is architected according to a hierarchical design comprising several layers of electrical switches, namely, access, aggregate and core layers. At a front end of the data center, content and load balancing switches are connected to the Internet through gateway routers, while at the back end, they are linked to core switches. Typically, the core switches are linked to aggregate switches, and the aggregate switches are connected to rack switches. Each rack switch is connected to the servers in the rack. The switches in the data center network operate usually over an electronic switch fabric, and the links between them either are copper cables or optical fibers. When a request comes from the external network, it first comes to the load balancing and content switches, which route the request to the appropriate servers. To fulfil the request, the servers can coordinate with other servers within the same or different racks. For example, the application servers can coordinate with the database servers to process the request. After completing the request, the response is sent to the external network through the gateway routers.

Conventional data center architectures such as described face many challenges including, without limitation, scalability, fault tolerance and energy efficiency. For example, in computing networking the notion of "resilience" refers to the ability to provide and maintain an acceptable level of service in the face of faults and challenges to normal operation. Threats and challenges for services can range from simple misconfiguration, to actual network attacks. Due to these challenges, many data center architectures are hard-pressed to handle the growing demand of cloud computing.

Data center performance also is impacted by the nature of the hardware systems that comprise the data center. Currently, hardware systems are prepackaged with a pre-defined number of CPUs and memory, and any extensions require adding additional memory and CPU. Moreover, to provide resilient solutions, typically it is necessary to create high availability (HA) clusters, which typically involve two or more physical servers. Preferably, such resilient systems are spread between different physical racks, and even more preferably between different data center buildings. An example service configuration for failure resistance might comprise two servers are anti-collocated, are organized as a cluster, and configured in an active-passive configuration. In this approach, the passive server is in a stand-by state monitoring the active server; if the active server fails, the passive server takes over the functionality of the active server and itself becomes the active server. In this approach, both active and passive servers have access to the same "shared" storage, but only the active server has writing permissions. Other configurations designed to avoid single points of failure (SPOF) are also in use.

While these approaches provide some advantages, these types of traditional systems do not adequately address component-level resiliency and failover. For example, and continuing with the above-identified example, if a CPU failure occurs on the primary server, then the entire server is considered to be failed-over, in which case there may be significant downtime or interruption expected while the passive server takes over responsibility. Further, this scenario can lead to loss of data in memory and other interruption, in the latter case because contents on the passive node need to re-read the contents in its memory. Such component-level resiliency typically is not achievable in traditional bare-metal server environments, where resources are bound to a box physically. In particular, if the primary server has a failure, then the entire server will go down and the application is failed over onto the secondary (passive) server.

Given that current systems are built as hardwired-configured servers, and other than what is built-in up front in any server, currently the only methods to augment resiliency are software methods. Although high-end mainframe computing systems contain various mechanisms to provide resiliency, these approaches cannot be used "on-demand" but rather are simply pre-built in the system. This increases the overall expense of the system, especially given that resiliency may not be needed very often, or if resiliency is needed only on-demand for particular workloads. These systems thus are costly, and the desirable resiliency features cannot be added or removed at times as operations may require.

Other known approaches (e.g., SLA systems) to providing for resiliency are built in a way to be cost conscious, or to achieve optimized load balancing and optimal utilization of the data center operation utilization. As noted, however, these known hardware approaches do not provide adequately for component-level resiliency, and such systems do not always provide a consistent level of resiliency across workloads, which can be problematic if a workload is mission-critical.

Therefore, there remains a need to provide techniques to address these and other problems associated with the prior art.

BRIEF SUMMARY

According to this disclosure, a method is provided for assigning resources in a compute environment. The method begins by providing a set of server resource pools, wherein a server resource pool typically comprises a set of resources of a common type (e.g., CPUs, memories, accelerators, etc.). For a given tenant, a server entity composed of one or more resources selected from one or more of the server resource pools is then defined. The one or more resources are selected from the one or more of the server resource pools based on a projected workload for the tenant, and a resiliency requirement that typically is specified in a service level agreement (SLA). As the tenant's workload is processed, information about the health of the one or more resources in the server entity is collected by monitoring those resources. When the monitoring indicates a change in health of a resource (e.g., a component failure) in the server entity, a composition of the server entity is then adjusted to attempt to maintain the resiliency requirement.

Typically, the notion of a "composition" of a server entity being changed may refer to the promotion of a standby component to replace a failed component, whether or not the standby component is from the server entity, or some other server entity. Indeed, a standby component may be promoted to take over for a failed component even if the standby component is being used at the time to handle some other workload (either for the tenant, or for some other tenant).

According to a second aspect of this disclosure, an apparatus for assigning resources in a compute environment is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for assigning resources in a compute environment is described. The computer program product holds computer program instructions executed in the data processing system and operative to perform operations such as the steps described above.

According to a fourth aspect of this disclosure, a data center facility is described. The data center comprises a set of server resource pools that comprise a compute pool, and a memory pool, and a disaggregated compute system comprising processors selected from the compute pool, computer memories selected from the memory pool, and an optical interconnect. The disaggregated compute system is configured to meet a resiliency requirement associated with a tenant, the resiliency requirement being associated with a tenant's service level agreement (SLA). The data center also includes a resiliency manager executing in a hardware element and responsive to a failure in one or more resources in the disaggregated compute system as the tenant's workload is processed to selectively adjust a composition of the disaggregate compute system to maintain the resiliency requirement.

The techniques described herein provide significant advantages. They enable initial resources to be appropriately allocated based on projected need, and with minimal or no customer impact even when component resources fail. Because a server entity is built-up from allocation of a subset of processors, a subset of memory, etc., only those resources that are needed to handle the workload are used. Further, when components in the server fail, the system obtains the additional resources needed, preferably based on locality considerations (i.e., where the additional resources are) to ensure continued compliance with the tenant's resiliency requirement. Because the approach leverages disaggregated servers, these advantages enable the data center to realize greater modularity, higher resource utilization, lower costs, and better performance. Server entities are built as needed, and the resources that comprise these entities are varied dynamically as needed to address component-level failures.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system environment wherein a "disaggregated server"—sometimes referred to herein as a "server entity"—is composed or constitutes server resources selected from (or assigned from) shared server resource pools, namely, one or more of: a compute pool, a memory pool, an accelerator (e.g., GPU accelerator, network accelerator, etc.) pool, a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Switching Optically-Connected Memory Architecture

By way of background, but not by way of limitation, the following describes a representative computer environment in which the techniques of this disclosure (described below) may be practiced.

Figure 1:
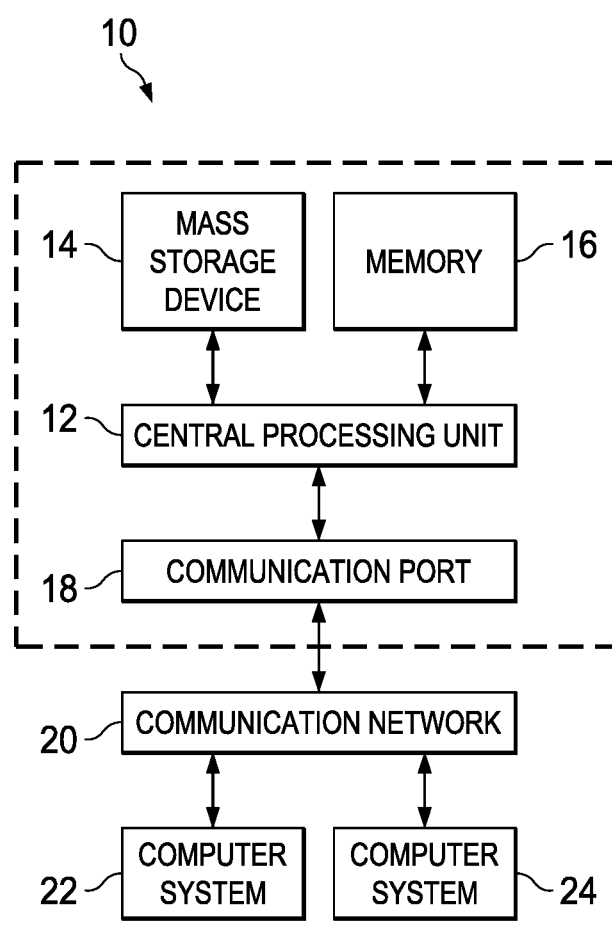
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
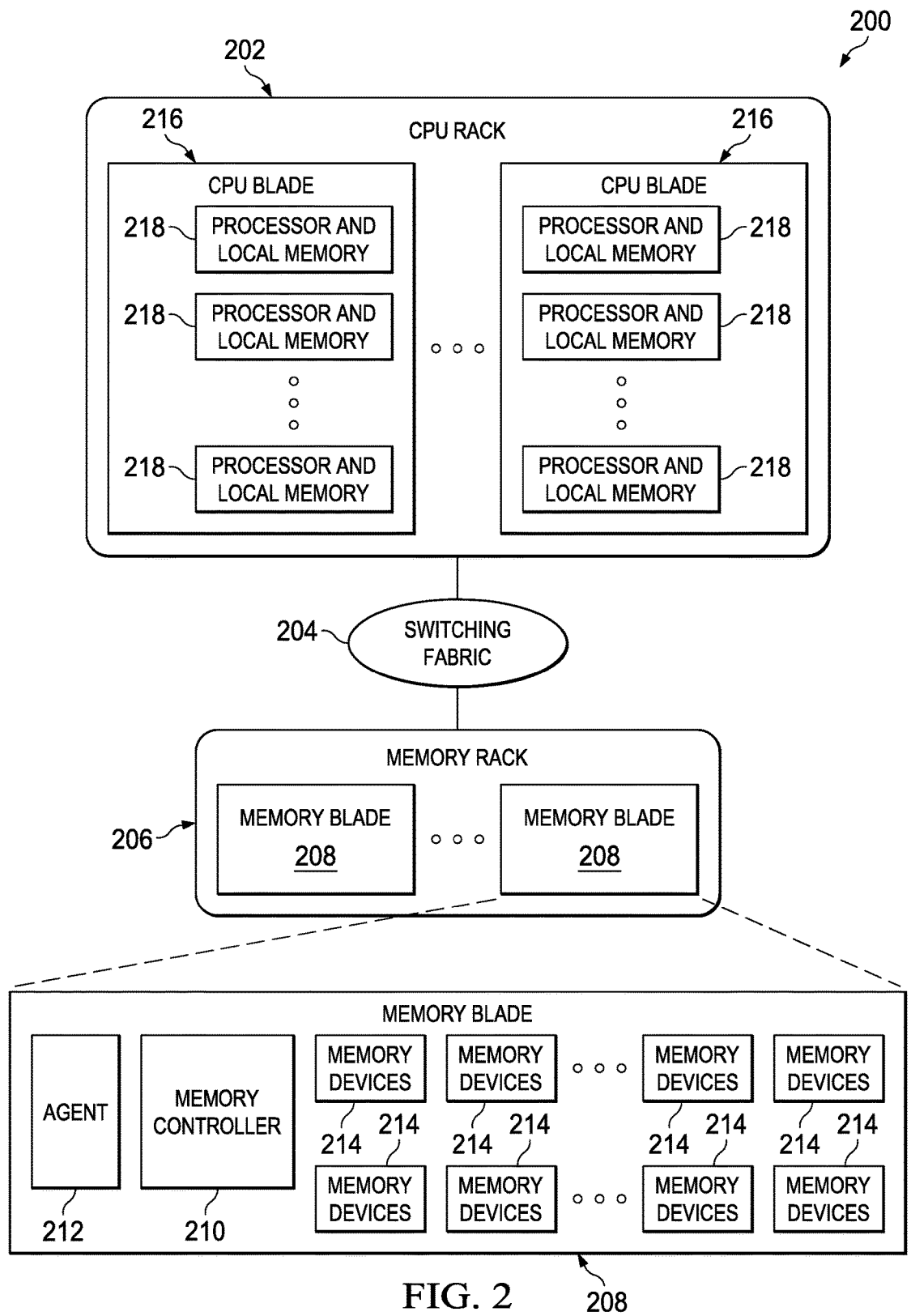
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
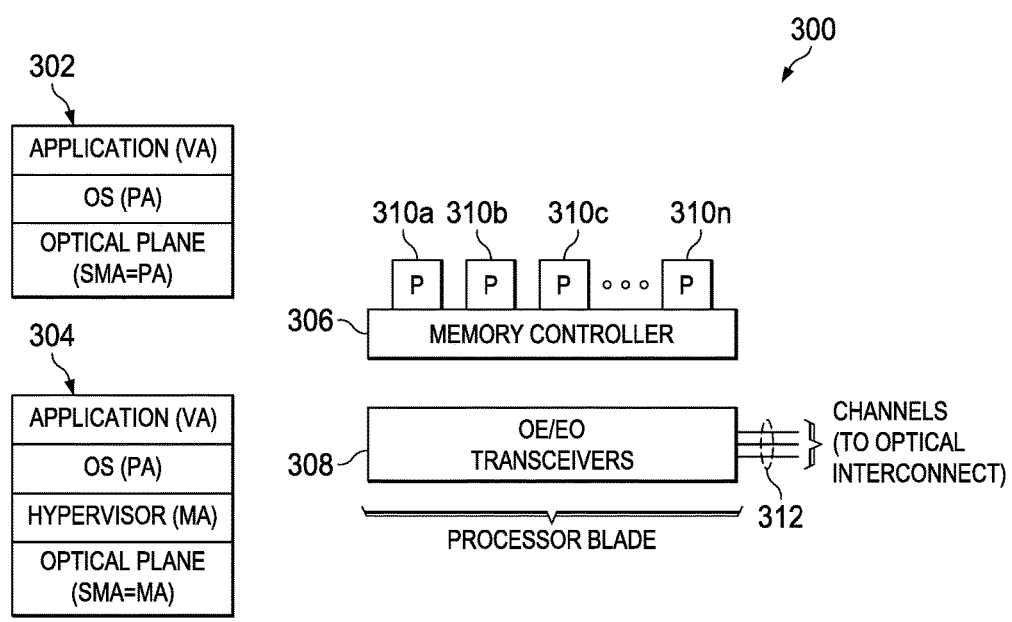
FIG. 3 depicts a block diagram illustrating a hardware structure of a processor design in the optically-connected memory system in FIG. 2.
Figure 4:
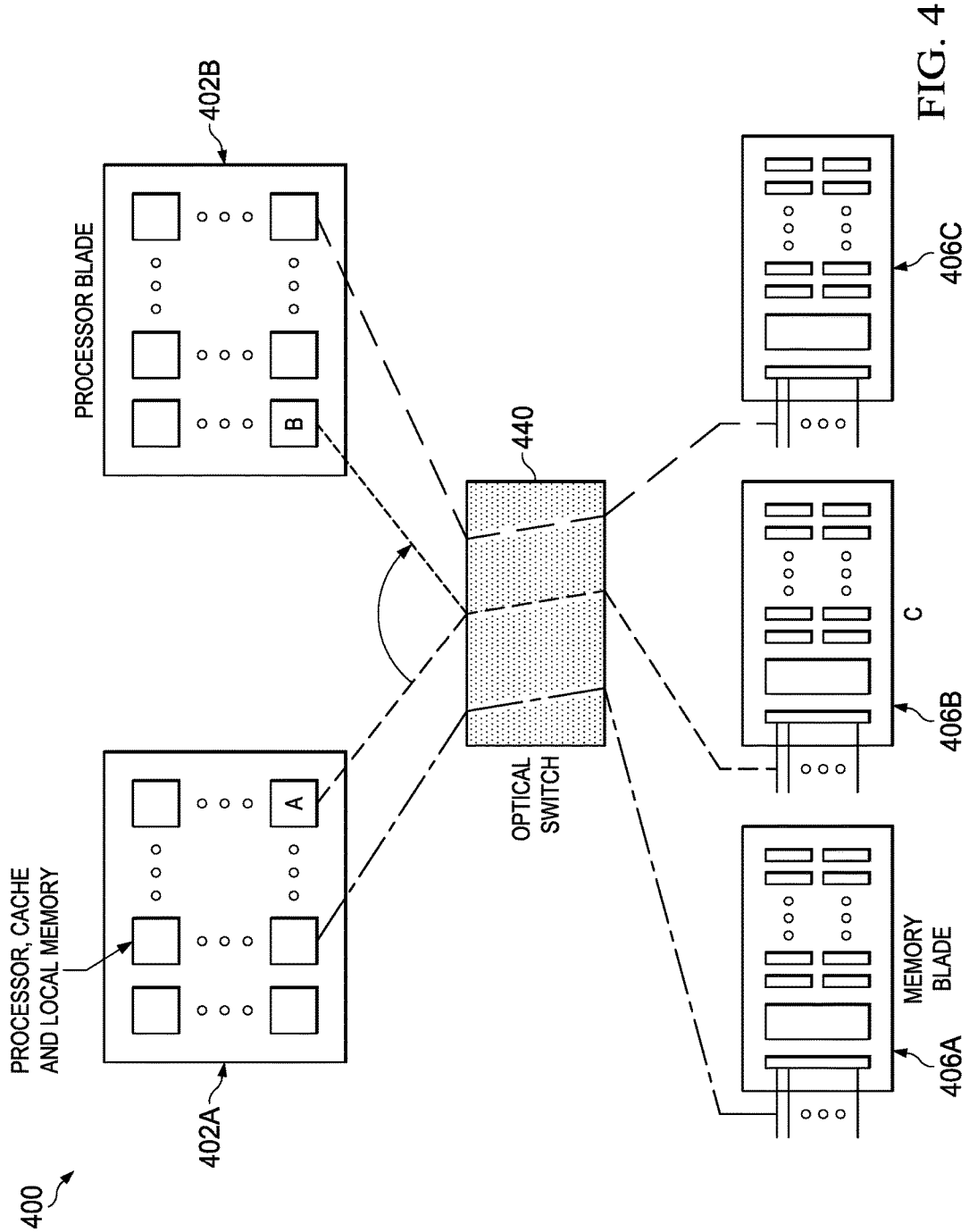
FIG. 4 is a block diagram illustrating a hardware structure for accessing memory at the processor.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a Remote Memory Address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 402A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment is preferred, it is not intended to be limiting. Aspects of the disaggregated compute system of this disclosure may be implemented in a data center that provides a conventional cloud computing model of service delivery. Thus, for completeness, the following section provides additional details regarding cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
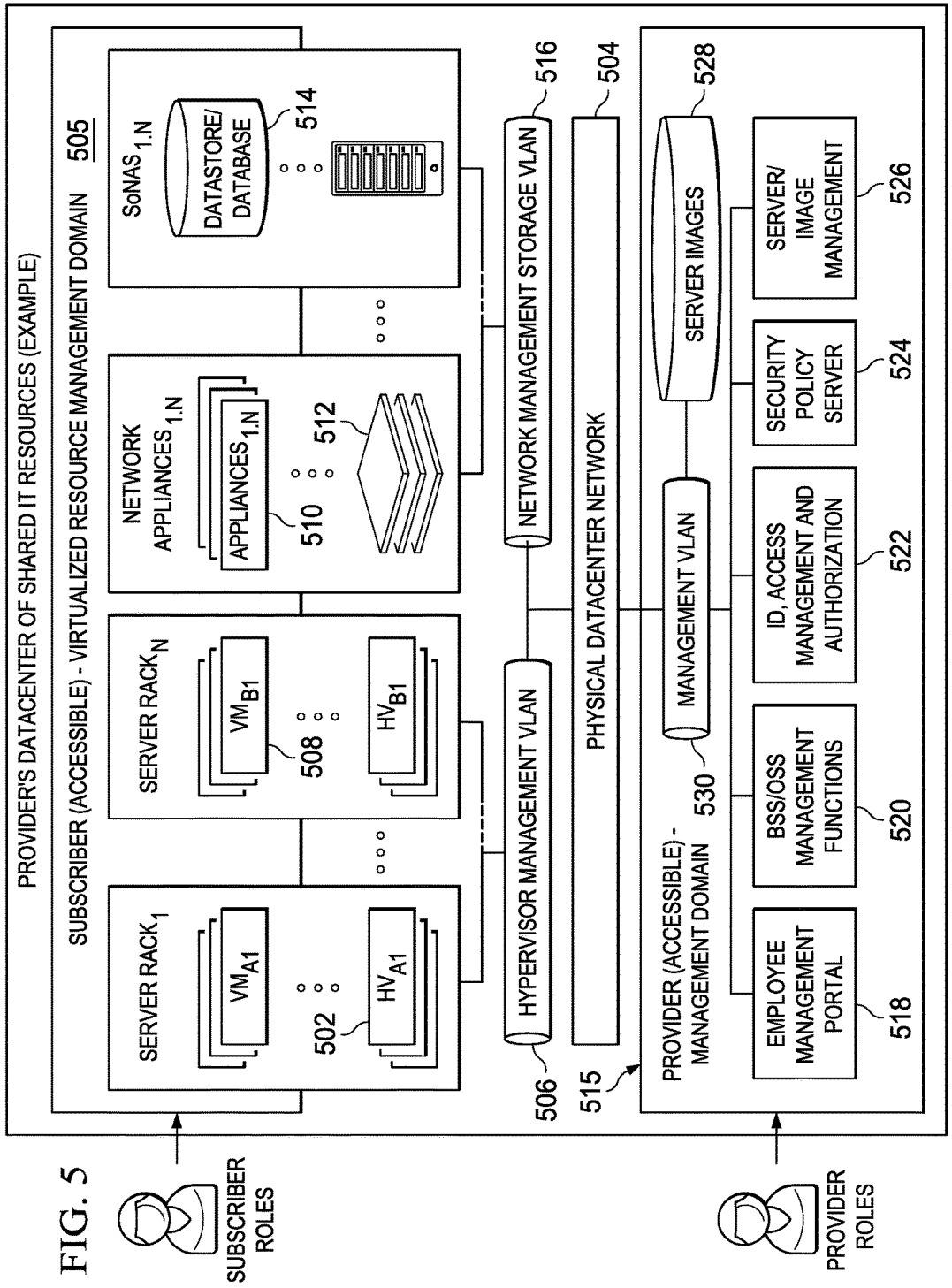
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

Disaggregate Compute System

With the above description providing several representative operating environments, the techniques of this disclosure are now described. In a preferred embodiment, the techniques are implemented within a hardware cloud environment, such as a disaggregated compute system wherein server resources in or across the data center are "disaggregated" into shared server resource pools, namely, one or more of: a compute pool, a memory pool, an accelerator pool, a storage pool, and the like. Servers are constructed dynamically, for example, on-demand and based on workload requirements, by allocating from these resource pools. A disaggregated compute system of this type keeps track of resources that are available in the shared server resource pools, and manages those resources based on that information.

Figure 6:
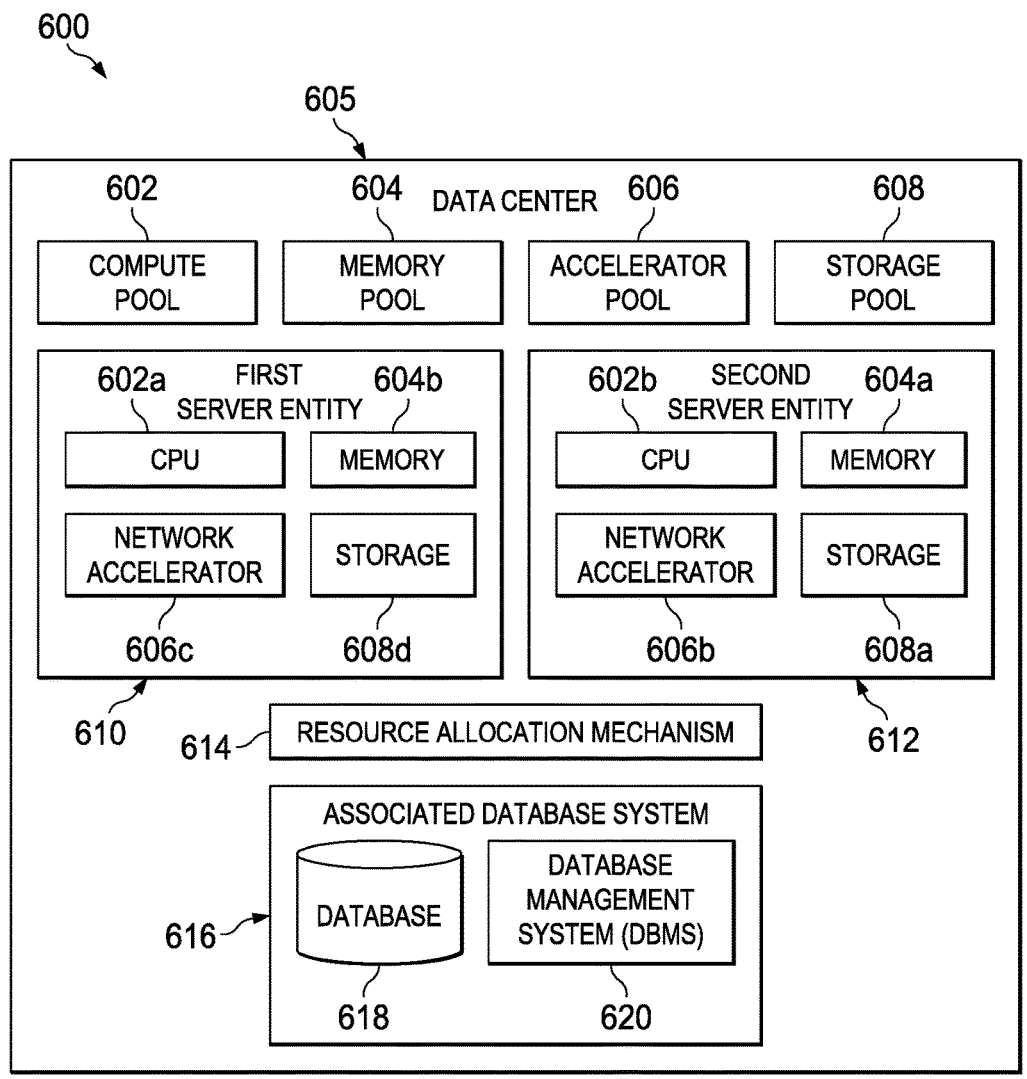
FIG. 6 depicts an alternative data center architecture in which the techniques of this disclosure may be implemented.

A representative disaggregated compute system 600 is shown with reference now to FIG. 6. In one embodiment, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, an accelerator pool 606, a storage pool 608, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity 610 may comprise CPU 602a (selected or otherwise obtained from compute pool 602), memory 604b (selected or otherwise obtained from memory pool 604), accelerator 606c (selected or otherwise obtained from accelerator pool 606), and storage 608d (selected or otherwise obtained from storage pool 608). A second server entity 612 may comprise CPU 602b, memory 604a, accelerator 606b and storage 608a. These examples are merely representative. The particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, preferably the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set) that, for each defined server entity, identifies the resources that comprise the server. Preferably, the data record is associated with an identifier, a unique server ID, and each resource the comprises the server is associated in the database with that unique server identifier. Thus, continuing with the example described above, the first server entity 610 may be associated with unique server $ID_1$, while the second server 612 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602a, memory 604b, GPU accelerator 606c and storage 608d are associated (by relational tables or otherwise) with unique server ID1, which is the unique server identifier for the first server entity 610. Likewise, and continuing with the second example, the various resource-specific identifiers for the CPU 602b, memory 604a, GPU accelerator 606b and storage 610a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

There may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, GPU accelerator and other components that define a server. Additionally, the tracking system keeps a record for each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

Specifying a Highly-Resilient System in a Disaggregated Cloud Environment

According to the techniques of this disclosure, component-level resiliency within a disaggregated compute system environment is enabled.

In general, a particular tenant in the disaggregated compute system environment has a resiliency requirement, which requirement typically is specified in or in association with a service level agreement (SLA) held by the tenant. The tenant's particular resiliency requirement need not be specified in an SLA. In such instances, one or more default resiliency requirements may be specified or otherwise configured in the data center. Typically, particular tenants in the data center environment may have different SLAs and thus differing resiliency requirements. A particular tenant's resiliency requirements as specified in the SLA or otherwise may depend on various factors, such as the type of tenant, the nature of the service(s) for which the tenant contracts, the type or types of workload(s) being processed, time-of-day, location, and others, as well as combinations of such factors. A tenant's particular resiliency requirement is assumed to be capable of being met by configuring one or more servers in the disaggregated compute system, and it is further assumed that each of the one or more servers are constructed statically or dynamically from the shared server resource pools. In this regard, and as described above, preferably the disaggregated compute system has a large pool of physical CPUs, and pool of accelerators and pool of memory, all preferably interconnected with high bandwidth, high performance optical interconnect. Thus, a "resilient" physical server created from resources in these resource pools comprises various components, e.g., CPU, memory and storage, etc., to provide the tenant a resilient system that will meet the tenant's resiliency requirements.

According to an aspect of this disclosure, and as will be described, physical components of a disaggregated system server are specified to build and maintain a resilient system for a tenant in or across a data center. Preferably, resiliency (and in particular a given resiliency requirement for a given tenant) is maintained by monitoring the health of components used in a system (e.g., for the tenant) and, as necessary, requesting and enabling a back-up component (as an active component) of that system. To this end, the disaggregated compute system includes (or has associated therewith) a "resiliency manager" (RM) function that tracks occupied and idle hardware components, monitors the health of the components, and selectively enables the backup components, e.g., in the case of a failure of one of the components of the system. The resiliency manager function typically operates on a per-tenant basis, but this is not a requirement or limitation. Generally, the resiliency manager is operative to build and maintain a resilient system, preferably based on locality of the resources and level of resiliency needed to meet the tenant SLA (or some other criteria). As noted above, typically the level of resiliency correlates with the tenant's SLA, but this is not necessarily a requirement.

A disaggregated compute system that includes the resiliency manager function of this disclosure may be a stand-alone system, or it may be otherwise associated with a known SLA system solution. A "higher-level" SLA typically means that the system is build using more resilient approaches as compared to a relatively "lower-level" SLA. The resiliency manager function may be implemented with one or more components or systems, typically as a set of software components that operate in association with other disaggregated compute system operations or as adjunct thereto. In one embodiment, the resiliency manager comprises a set of components that perform separate operations, such as tracking, component health monitoring, and component failover processing (re-allocations).

By way of additional background, the disaggregated compute system may comprise multiple physical drawers, multiple physical racks, and multiple physical blocks (of resources). A CPU block (having multiple CPUs) may be allocated to one or more servers. Likewise, a memory block (having multiple memories) may be allocated to one or more servers. The level and type of resiliency provided will vary depending on configuration. For example, a multiple CPU block can be allocated to a server, with some of the CPU units in the block being "active" while others are "passive." As used herein, the terms "active" and "passive" are relative, but typically an "active" node or component refers to the primary processing/storage element, while typically a "passive" node or component refers to the backup processing/storage element. The terms "primary" and "secondary" are synonymous to active and passive, respectively. More generally, the active/primary may be considered the "first" server while the passive/secondary is considered a "second" server. Additionally, it is assumed possible to use two or more CPUs in a CPU block in an active-active configuration. Likewise, a memory block can be mirrored to a second memory block in the same memory pool (to provide an active-passive configuration), or a memory block can be mirrored to a memory block in a remote pool. Typically, a particular configuration (whether active or passive) is configured as a storage tuple (e.g., mirrored storage, multiple processor—memory block—SSD).

As noted above, preferably the resiliency manager is operative to track the servers in the disaggregate compute system that are configured with the resiliency capability of this disclosure. In addition, the resiliency manager tracks the components of each such server and how those components are arranged, so that the compute resources tied to a primary server can be associated with a secondary server. The resiliency manager's basic operation is to take this data (which may be maintained in a separate tracking system) and to manage the association of the resources appropriately for the primary and secondary server. Then, when a particular first component fails (e.g., a CPU on the primary server), the resiliency manager can take an appropriate first component-level action (e.g., link a component on the secondary server to the memory of the primary server) to address the issue. In this manner, the resiliency manager addresses component-level failures that might otherwise impact the tenant's SLA. Preferably, the resiliency manager operates continuously to attempt to maintain the tenant's SLA. Thus, continuing with this example, when a particular second component fails (e.g., CPU failure on the primary server), the resiliency manager takes an appropriate second component-level action (e.g., link the CPU on the secondary server to the memory and storage on the primary server) to address the issue, and so on for additional component failures.

Generalizing, the resiliency manager operates to track components and their health, and it adjusts server resource configurations dynamically based on locality of the resources and level of resiliency required to maintain the SLA for each of one or more tenants in or across the data center. As a skilled person will appreciate, the notion of "maintaining" the SLA depends on context, and it does not necessarily imply that the resiliency manager operates to meet any absolute SLA constraint or requirement. Further, the resiliency manager may operate to adjust resource configurations across "active-active" configurations, or "active-passive" configurations, or otherwise.

Figure 7:
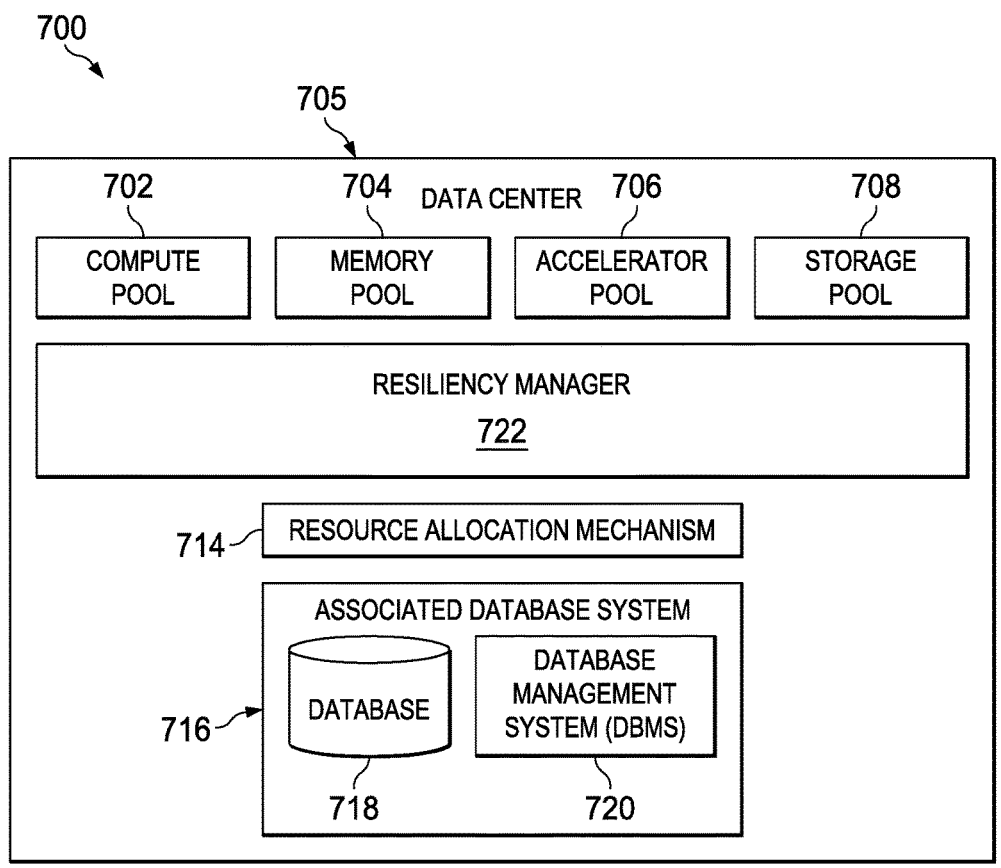
FIG. 7 depicts a preferred data center architecture according to this disclosure.

FIG. 7 depicts a preferred embodiment of this disclosure. As in FIG. 7, disaggregated compute system 700 is configured within a data center 705 in which a switching optically-connected memory architecture is used. In the disaggregated compute system 700, there are shared server pools, e.g., a compute pool 702, a memory pool 704, an accelerator pool 706, a storage pool 708, and perhaps others. As noted above, and to manage basic resource allocations and de-allocations, the disaggregated compute system 700 keeps track of resources that are available in the shared server resource pools and that are allocated or de-allocated to the various server entities. To this end, the disaggregated compute system 700 comprises (or has associated therewith) a tracking system comprising a resource allocation mechanism 714, and an associated database system 716. As previously described, the resource allocation mechanism 714 generally is responsible for executing one or more allocation algorithms that create and manage server entities. These algorithms use information stored in the database system 716 to carry out the management functions. As noted above, the database system 716 stores information that tracks the state, status or other properties and attributes of the various resources in the shared server pools. In addition, preferably the database stores information about each server entity built by the resource allocation mechanism. The database system 716 comprises a database 718 and a database management system (DBMS) 720. The database stores a data record (or, more generally, a data set) that, for each defined server entity, identifies the resources that comprise the server. Preferably, the data record is associated with an identifier, a unique server ID, and each resource the comprises the server is associated in the database with that unique server identifier. Additionally, the database system 716 comprises a data record associated with the SLA and resiliency requirements at a per-tenant or per-server level.

According to this disclosure, the disaggregate compute system 700 also includes a resiliency manager 722 that, as noted, tracks occupied and idle hardware components, monitors the health of the components, and selectively enables the backup components, e.g., in the case of a failure of one of the components of the system. To this end, typically the resiliency manager works in conjunction with the resource allocation mechanism 714, and it uses the server and resource identifier information that is maintained in the database system 716. The resiliency manager 722 functions may be built into the resource allocation mechanism. As noted above, the resiliency manager (or one or more functions thereof) may be implemented on one or more mores software systems, on co-located or distinct machines, or through use of other systems and services in the data center environment. For example, the resiliency manager may utilize a component monitoring function provided by IBM® Systems Director, a unified systems management platform that provides tools for discovery, inventory, status, configuration, system health, resource monitoring, system updates, event notification and management automation in a data center environment. As noted above, the particular implementation of the resiliency manager is not a limitation of this disclosure.

The following provide several representative use cases of the resiliency manager in FIG. 7.

The first set of scenarios are "CPU failure" scenarios. These scenarios assume a disaggregate compute system, that servers have been specified from the shared server pools, that particular resources have been allocated to each of a primary and a secondary server, and that a particular "baseline" configuration for these server(s) has been specified for a particular tenant (and its workload).

A first CPU failure scenario is a partial failure of one or more allocated CPUs (of a CPU block) in the primary server. In such case, the resiliency manager de-allocates the failed CPUs and allocates new CPUs to the primary server (as, in this example scenario, fail over to the secondary server is not required). This type of scenario may be suitable for workloads that are not mission-critical or have lower SLAs, because the approach does not cover the loss of all CPUs in the block. One variant of this scenario is when the workload running on the failed CPUs has a relatively "higher priority" than other workloads, in which case the resiliency manager fails over CPUs and allocates a new block of CPUs, but where the "new block of CPUs" are those running "low priority" workloads. Thus, in this example scenario, CPUs in the block that are running low priority workloads are used to take over responsibility for the one or more CPUs that have failed while running a "higher priority" workload. As a further variant, only a subset of CPUs currently servicing the low priority workloads are re-assigned to the higher priority workload that was running on the one or more failed CPUs.

In a second CPU failure scenario, secondary CPUs are assigned to be in a standby mode. The secondary CPUs may be in a separate block that is dedicated to be ready to handle processing for workloads in the event the one or more CPUs fail. In this example, the resiliency manager identifies such a failure, promotes the standby CPUs to be the active CPUs, and de-allocates the failed CPUs. Preferably, the CPUs that are promoted continue working on the same memory block. In this example, the standby set of CPUs can be allocated in the same or in a different drawer, depending on SLAs and cost requirements. In one further variant, both the active and standby CPUs of a server are tagged with the Server ID of the server. The standby CPU is set to a standby mode. Once a failure of an active CPU is detected (e.g., through monitoring by a tool like IBM Systems Director), the resiliency manager changes the mode of these CPUs from standby to active and changes the mode of failed CPUs from active to failed.

In a third CPU failure scenario, an application is running on two sets of CPUs, and the resiliency manager is monitoring the CPU health. In this scenario, which may be applicable when a high level SLA is required), the secondary CPU block is located in a different drawer, or a different rack. If a failure is identified, the application continues running on the surviving set of CPUs. The resiliency manager, however, then makes the secondary CPU block the active set, de-allocates the failed CPUs, and allocates the new set of CPUs in the same or a different drawer from the failed CPU set. Preferably, the resiliency manager also restores the initial cluster configuration. In this example, the resiliency manager also may take CPUs that are running low priority workloads and allocate them to the higher priority workload associated with the failed resource. As in an earlier example, only a subset of CPUs with one or more low priority workloads are re-assigned to a higher priority workload that was running on the failed resource.

In yet another CPU failure example, it is assumed there is a multi-cluster configuration that also implements a voting mechanism or algorithm, all in a known manner. In this example, the resiliency manager is monitoring the clusters, which are each running the same application. This type of implementation is typically used only for the highest-level SLA workloads. In this example, data that needs to be written into memory is being calculated by each of the CPU blocks running an instance of the application, and that data is written when the majority of CPU blocks are in agreement (before committing to the memory block). If one set of CPUs then fails, the resiliency manager allocates new resources, preferably in the same way as described in the prior example.

Another CPU failure scenario might involve a supercomputing analytics-based, long-running workload, wherein calculation correctness and data consistency are the highest requirements. In this example, caches typically are set in a write-through mode for increased resilience level. This approach reduces the amount of time of inconsistent data, and the amount of data loss in the case of a failure. This scenario is useful for workloads that require very long run times, and are of a large scale. In this example, preferably secondary sets of CPUs are allocated in the same way as the first use case described above. Then, when the resiliency manager detects a CPU failure, the new CPUs are allocated and configured in write-through mode as well.

The resiliency manager also can address failures of the other types of components that are used in the server. Thus, for example, typical memory-related failures may include, without limitation, a first scenario where, following a failure, a memory block is assigned to a server with no mirroring implemented, a second scenario where, following a failure, a memory block is mirrored to a second memory block in the same memory pool, or a third scenario where, following a failure, a memory block is mirrored to a memory block in a remote pool, and so forth.

The above examples are not intended to be limiting but merely illustrative of the many ways in which the resiliency manager is used to address CPU, memory and other component failures in a system that uses servers built from resource pools. The resiliency manager may be configured to operate with respect to certain component failures, or failures of different component types. The resiliency manager may have one or more default resiliency settings for each type of component, or particular resiliency settings may be customized for each type of component. As noted above, according to the basic operation, a particular tenant will have associated therewith a resiliency requirement (specified generally, or perhaps per component-type), and the resiliency manager operates continuously as the tenant's workload is processed to adjust the components in the server as and when components fail to ensure that the resiliency requirement continues to be met. In this manner, the resiliency manager advantageously provides for component-level resiliency within the data center environment.

As will be appreciated, the techniques described herein provide a method for specifying a highly resilient system in a disaggregated cloud environment. The method includes providing resource pools from which servers of the disaggregate compute system are built. For a given tenant having a SLA, resources from each of the pools are selected to meet a resiliency requirement for a server entity that is assigned to the tenant. As the tenant's workload is being processed, the health of the selected resources is monitored. In response to a change in health of the resources (e.g., a CPU failure, a memory failure, or the like), other resources from the pools are then selected for the server to that the resiliency requirement continues to be maintained. The other resources may be those that have been pre-selected for use and whose operating status is changed (e.g., from "passive" or "standby" to "active") on-demand and as needed to continue to meet the resiliency requirement. Thus, according to this disclosure, the various components that comprise a server may vary as one or more components fail.

The notion of "failure" here may be a relative term instead of requiring some absolute failure mode. Thus, a particular component may be deemed to have failed when its operating characteristic(s) fall below some configurable threshold for performance, reliability, latency or other factor.

Further, the notion of "maintaining" the resiliency requirement for a given tenant as components fail and the resiliency manager adjusts the server entity accordingly is not necessarily an absolute requirement. Thus, the resiliency manager can be said to maintain the resiliency requirement when the newly-constituted server entity (or some new server entity) is within a configurable threshold associated with the resiliency requirement. Also, "maintaining" the resiliency requirement may also be satisfied by attempting to maintain that requirement to some configurable degree.

Moreover, the notion of a "composition" of a server entity being changed by the resiliency manager may refer to the promotion of a standby component to replace a failed component, whether or not the standby component is from the server entity, or some other server entity. As noted above, a standby component may be promoted to take over for a failed component even if the standby component is being used at the time to handle some other workload (either of the tenant, or some other tenant).

The techniques described herein provide significant advantages. They enable initial resources to be appropriately allocated based on projected need, and with minimal or no customer impact even when component resources fail. Because a server entity is built-up from allocation of a subset of processors, a subset of memory, etc., only those resources that are needed to handle the workload are used. Further, when components in the server fail, the system obtains the additional resources needed, preferably based on locality considerations (i.e., where the additional resources are) to ensure continued compliance with the tenant's resiliency requirement. Because the approach leverages disaggregated servers, these advantages enable the data center to realize greater modularity, higher resource utilization, lower costs, and better performance. Indeed, with the emergence of larger data centers and the need for clouds with ever-larger numbers of servers, the approach provides a way for a data center to operate in a much more cost-effective and reliable manner. Server entities are built as needed, and the resources that comprise these entities are varied dynamically as needed to address component failures. The approach solves the workload allocation issues that result from use of traditional servers, which suffer from resource fragmentation when one or more resources therein fail or become underutilized due to mismatched or changing workload requirements. By using shared resource pools and the resource allocation methods and resiliency management described herein, the servers are constructed dynamically and on-demand by allocating one or more components from these resource pools according to the workload's requirements, even as components in these servers may fail.

The advantages described herein are provided for by maintaining and using the various resource server pools, and the resource allocation mechanism and resiliency management that enables generation and management of the server entities. An embodiment of such an approach that further includes the tracking system and its associated database of unique server identifiers and their associated data enables the system to provide more robust inventory management over the server resource pools, and to ensure that tenant resiliency requirements continue to be met despite hardware problems in the data center.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

Having described our invention, what we now claim is as follows:

1. A method for assigning resources in a compute environment, comprising:
   providing a set of server resource pools, wherein a server resource pool comprises a set of resources of a common type;
   for a given tenant, defining a server entity composed of one or more resources selected from one or more of the server resource pools, wherein the one or more resources are selected from the one or more of the server resource pools based on a projected workload and a resiliency requirement;
   receiving information collected from monitoring health of the one or more resources in the server entity as an actual workload is processed for the given tenant; and
   based on the monitoring indicating a change in health of a resource in the server entity, adjusting a composition of the server entity to attempt to maintain the resiliency requirement.

2. The method as described in claim 1 the change in health of a resource is a component failure.

3. The method as described in claim 2 wherein the component failure is one of: a processor failure, a memory failure, an accelerator failure, a storage failure, and another component failure.

4. The method as described in claim 1 wherein adjusting the composition of the server entity de-allocates a failed component and promotes a second component of a same type to assume responsibility for the failed component.

5. The method as described in claim 4 wherein the second component that is promoted is associated with the server entity, or a different server entity.

6. The method as described in claim 4 wherein the second component that is promoted is assigned based on its network locality relative to the failed component.

7. The method as described in claim 4 further including de-associating another lower-priority workload that is running on the second component from the second component prior to promoting the second component to assume responsibility for the failed component.

8. The method as described in claim 1 wherein resources are assigned for multiple tenants, and at least first and second of the multiple tenants have different resiliency requirements.

9. Apparatus for assigning resources in a compute environment, comprising:
one or more hardware processors;
computer memory holding computer program instructions executed by the hardware processors and operative to:
manage a set of server resource pools, wherein a server resource pool comprises a set of resources of a common type;
for a given tenant, define a server entity composed of one or more resources selected from one or more of the server resource pools, wherein the one or more resources are selected from the one or more of the server resource pools based on a projected workload and a resiliency requirement;
receive information collected from monitoring health of the one or more resources in the server entity as an actual workload is processed for the given tenant; and
based on the monitoring indicating a change in health of a resource in the server entity, adjust a composition of the server entity to attempt to maintain the resiliency requirement.

10. The apparatus as described in claim 9 wherein the change in health of a resource is a component failure.

11. The apparatus as described in claim 10 wherein the component failure is one of: a processor failure, a memory failure, an accelerator failure, a storage failure, and another component failure.

12. The apparatus as described in claim 9 wherein the computer program instructions to adjust the composition of the server entity are operative to de-allocate a failed component and promote a second component of a same type to assume responsibility for the failed component.

13. The apparatus as described in claim 12 wherein the second component that is promoted is associated with the server entity, or a different server entity.

14. The apparatus as described in claim 12 wherein the second component that is promoted is assigned based on its network locality relative to the failed component.

15. The apparatus as described in claim 12 wherein the computer program instructions are further operative to de-associate another lower-priority workload that is running on the second component from the second component prior to promoting the second component to assume responsibility for the failed component.

16. The apparatus as described in claim 9 wherein resources are assigned for multiple tenants, and at least first and second of the multiple tenants have different resiliency requirements.

17. A computer program product in a non-transitory computer readable medium for use in a data processing system for assigning resources in a compute environment, the computer program product holding computer program instructions executed in the data processing system and operative to:
manage a set of server resource pools, wherein a server resource pool comprises a set of resources of a common type;
for a given tenant, define a server entity composed of one or more resources selected from one or more of the server resource pools, wherein the one or more resources are selected from the one or more of the server resource pools based on a projected workload and a resiliency requirement;
receive information collected from monitoring health of the one or more resources in the server entity as an actual workload is processed for the given tenant; and
based on the monitoring indicating a change in health of a resource in the server entity, adjust a composition of the server entity to attempt to maintain the resiliency requirement.

18. The computer program product as described in claim 17 wherein the change in health of a resource is a component failure.

19. The computer program product as described in claim 18 wherein the component failure is one of: a processor, failure, a memory failure, an accelerator failure, a storage failure, and another component failure.

20. The computer program product as described in claim 17 wherein the computer program instructions to adjust the composition of the server entity are operative to de-allocate a failed component and promote a second component of a same type to assume responsibility for the failed component.

21. The computer program product as described in claim 20 wherein the second component that is promoted is associated with the server entity, or a different server entity.

22. The computer program product as described in claim 20 wherein the second component that is promoted is assigned based on its network locality relative to the failed component.

23. The computer program product as described in claim 20 wherein the computer program instructions are further operative to de-associate another lower-priority workload that is running on the second component from the second component prior to promoting the second component to assume responsibility for the failed component.

24. The computer program product as described in claim 17 wherein resources are assigned for multiple tenants, and at least first and second of the multiple tenants have different resiliency requirements.

25. A data center facility, comprising:
a set of server resource pools that comprise a compute pool, and a memory pool;
a disaggregated compute system comprising processors selected from the compute pool, computer memories selected from the memory pool, and an optical interconnect, the disaggregated compute system being configured to meet a resiliency requirement associated with a tenant, the resiliency requirement being associated with a tenant's service level agreement (SLA); and
a resiliency manager executing in a hardware element and responsive to a failure in one or more resources in the disaggregated compute system as the tenant's workload is processed to selectively adjust a composition of the disaggregate compute system to maintain the resiliency requirement.

* * * * *